(12) United States Patent
Götzinger (10) Patent No.: US 11,754,078 B2
(45) Date of Patent: Sep. 12, 2023

(54) PARAMETER CONSTANCY

(71) Applicant: ebm-papst Mulfingen GmbH & Co. KG, Mulfingen (DE)

(72) Inventor: Marvin Götzinger, Buchen-Götzingen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 249 days.

(21) Appl. No.: 16/970,674

(22) PCT Filed: Feb. 26, 2019

(86) PCT No.: PCT/EP2019/054770
§ 371 (c)(1),
(2) Date: Aug. 18, 2020

(87) PCT Pub. No.: WO2019/166449
PCT Pub. Date: Sep. 6, 2019

(65) Prior Publication Data
US 2020/0378391 A1     Dec. 3, 2020

(30) Foreign Application Priority Data
Feb. 27, 2018   (DE) ..................... 10 2018 104 396.1

(51) Int. Cl.
*F04D 27/00*    (2006.01)
*F04D 25/08*    (2006.01)
*F04D 25/06*    (2006.01)

(52) U.S. Cl.
CPC ........... *F04D 25/08* (2013.01); *F04D 27/004* (2013.01); *F04D 25/06* (2013.01); *F05D 2270/02* (2013.01)

(58) Field of Classification Search
CPC ........ F04D 25/08; F04D 25/06; F04D 27/004; F04D 2270/02; Y02B 30/70
See application file for complete search history.

(56) References Cited

U.S. PATENT DOCUMENTS 5,689,960 A  * 11/1997 Bearint ................ B60H 1/3216
                                                  417/295
9,746,228 B2 *  8/2017 Sibik .................. F04D 27/0246
(Continued)

FOREIGN PATENT DOCUMENTS

DE        4107481 A1     9/1992
DE       10035829 A1     4/2001
(Continued)

OTHER PUBLICATIONS

European Patent Office, Rijswijk, Netherlands, International Search Report of International Application No. PCT/EP2019/054770, dated May 24, 2019, 2 pages.

*Primary Examiner* — Thomas Fink
(74) *Attorney, Agent, or Firm* — Dickinson Wright PLLC (57) ABSTRACT

A method for regulating fluidic parameters of a ventilator in a system that includes regulating at least one fluidic parameter Pi, actual to a predetermined target value Pi, target by at least one motor parameter Mi of a ventilator in a system, wherein the ventilator is operated with a motor parameter Mi regulated to a constant value, wherein first, actual values of the motor parameters Mi are acquired and actual values of fluidic parameters Pi, actual are determined, and a comparison of the actual values and the target values is carried out, wherein, in the case of a deviation of the actual-target comparison of the parameters, an adjustment of the rotational speed occurs, in order to reach the predetermined target value.

10 Claims, 6 Drawing Sheets

(56) References Cited

U.S. PATENT DOCUMENTS

2014/0057215 A1* 2/2014 Kuczynski ............... F23L 7/00
110/297
2016/0281723 A1 9/2016 Zhang et al.
2017/0350404 A1 12/2017 Sasaki et al.

FOREIGN PATENT DOCUMENTS

| DE | 102007017682 A1 | 10/2007 |
| EP | 1990584 A2 | 11/2008 |
| EP | 2508811 A1 | 10/2012 |
| KR | 1020100133094 A | 12/2010 |

* cited by examiner

PARAMETER CONSTANCY

CROSS REFERENCE TO RELATED APPLICATIONS

This application is a 35 U.S.C. § 371 national phase application of International Application No.: PCT/EP2019/054770, filed Feb. 26, 2019, which claims the benefit of priority under 35 U.S.C. § 119 to German Patent Application No.: 10 2018 104 396.1, filed Feb. 27, 2018, the contents of which are incorporated herein by reference in their entirety.

FIELD

The invention relates to a method for regulating fluidic parameters on the basis of motor parameters of a ventilator. The invention relates in particular to a method for regulating fluidic parameters of a ventilator wherein no unequivocal association between the rotational speed, the power and the volume flow of the ventilator is possible.

BACKGROUND

The statements in this section merely provide background information related to the present disclosure and several definitions for terms used in the present disclosure and may not constitute prior art.

In many application cases the installed ventilator must reach the predetermined air output exactly—and this independently of changing external and internal influences for the entire duration of use of the device.

Numerous examples of this exist: In residential ventilation devices, the optimal heat exchange is operational only if the inlet and outlet flows correspond to the set value. Ventilator units for clean rooms ensure a defined flow state in the room only if the volume flow is regulated to the required value. For safety reasons, for a laboratory cabinet, the excess pressure must be kept constant independently of leakage flows.

In practice two relevant effects occur primarily. On the one hand, the operating point can change over time, for example, as a result of filters that are clogged with dirt, shifting wind impacts or changing thermal updraft forces on high-rise buildings. On the other hand, depending on the installation, external resistances of different magnitudes result, for example, due to the connection to pipeline systems of different designs or due to obstructions in the suction or discharge area of the device.

One aspect of the present disclosure consists in providing a universal solution for different ventilator designs, wherein the regulation of fluidic parameters is carried out on the basis of the interaction between motor parameters and a given specific regulatory framework.

The so-called ventilator characteristic curve represents the mutual dependency of the volume flow and the pressure increase. The course of the ventilator characteristic curve depends on the design of the ventilator. The ventilator characteristic curves are typically measured and acquired on a suitable ventilator test stand. However, it must be taken into account that the characteristic curves were typically measured under ideal conditions on individual freestanding representative fans of a fan production series with unimpeded flow. The actual characteristic curve under installation conditions can deviate therefrom. The operating point of a ventilator is obtained as the intersection of the ventilator characteristic curve and the system characteristic curve.

The actual volume flow through the system is therefore determined by the operating point. A constant volume flow cannot be represented without difficulty. Depending on the respective on-site conditions, the counter-pressure varies and as a result the available volume flow varies very strongly.

EP 2 508 811 B1 discloses a device for determining the volume flow conveyed by a ventilator, the device being provided in the area of an intake nozzle of the ventilator, as well as being provided with a differential pressure sensor for connecting a measurement opening to a reference tube.

Blowers with sensor-free regulation, which were developed especially for residential ventilation devices, already exist. As already described, it is particularly important to keep the set volume flows constant independently of filter soiling and the connected pipe channels. The approach without additional sensors used for that purpose relies only on motor load information which is either present or can be determined with little additional expenditure. According to an objective of the present disclosure, the information of a flow sensor can be entirely dispensed with. In order to be able to implement this approach, an unequivocal connection between the motor load and the air output of the ventilator ("continuous monotonic characteristic curve") must be present. This requirement is not met by all the ventilator types, but it applies, for example, to blowers with radial wheels having a forward curvature. Here, the actual operating point can be determined from the rotational speed and the motor current. For this purpose, approximation functions are used, the coefficients of which have been determined beforehand from air output and the motor measurements and stored in a microcontroller.

The regulator implemented in the commutation electronics of the fan compares the calculated actual values with the predetermined target values and readjusts accordingly.

Therefore, an underlying aim of the present disclosure is to provide a universally usable regulation method for regulating fluid parameters of a ventilator, in particular a regulation method for regulating fluidic parameters of a ventilator wherein no unequivocal association between the rotational speed, the power and the volume flow of the ventilator is possible.

SUMMARY

The objective of the present disclosure is achieved by the combination of features according to a method for regulating at least one fluidic parameter $P_i$, actual to a predetermined target value $P_i$, target by at least one motor parameter $M_i$ of a ventilator in a system, wherein the ventilator is operated with a motor parameter $M_i$ regulated to a constant value, wherein first, actual values of the motor parameters $M_i$ are acquired and actual values of fluidic parameters $P_i$, actual are determined, and a comparison of the actual values and the target values is carried out, wherein, in the case of a deviation of the actual-target comparison of the parameters, an adjustment of the rotational speed occurs, in order to reach the predetermined target value.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

One basic objective of the present disclosure consists in providing a universal solution for different ventilator designs, wherein the regulation of at least one fluidic parameter is carried out on the basis of the interaction between the motor parameters and a given specific regulatory framework.

Therefore, according to the invention, a method is described for regulating at least one fluidic parameter $P_{i,\ actual}$ to a predetermined target value $P_{i,\ target}$, (for example, $qv_{target}$) by at least one motor parameter Mi of a ventilator in a system. This target value is established at the beginning of the method and by the user and can be changed during the method by the user. At the beginning of the regulation, the ventilator is in operation and the operating point of the ventilator is known. The ventilator is operated with a motor parameter Mi (for example, Pe) regulated to a constant value. First, actual values of the motor parameters Mi (for example, Pe, n, l are acquired, and actual values of fluidic parameters $P_{i,\ actual}$ (for example, $p_{actual}$, $qv_{actual}$) are determined preferably with a measured ventilator characteristic diagram stored in the ventilator and compared with the target values $P_{i,\ target}$). If the actual values correspond to the target values of the fluidic parameters, then the ventilator does not adjust and continues to be operated with motor parameters Mi (for example, Pe) regulated to a constant value. A comparison of the parameters occurs again until a change of the motor parameters can be detected.

In the case of a change of the operating point and thus a change of at least one motor parameter, it is determined whether a deviation of at least one fluidic parameter above the inflection operating point results.

For the case in which the fluidic parameter does not exceed the inflection operating point, the constant value of the motor parameter is changed via a rotational speed change so that the actual value of the fluidic parameter is regulated to its target value, without a change of the motor parameter Mi occurring.

For the case in which the fluidic parameter exceeds the inflection operating point, the motor parameter Mi regulated to a constant value changes (for example from Pe to n), and the constant value of the motor parameter Mi is changed via a rotational speed change so that the actual value of the fluidic parameter is regulated to its target value.

The necessary rotational speed change is determined from the measured fluidic and motor-related parameter characteristic diagram of the ventilator stored beforehand in the ventilator. The rotational speed change can occur, for example via a comparison of the recorded fluidic parameters and motor parameters or can be determined by an interpolation of the values stored in the parameter characteristic diagram. In addition, the rotational speed change can be determined by means of the applicable ventilator rules.

A particularly preferable embodiment of the present disclosure provides that the parameter to be regulated is the volume flow or the pressure. Other advantageous developments of the present disclosure are characterized and represented in further detail below in connection with the description of the preferred embodiment of the invention in reference to the figures.

Figure 1:
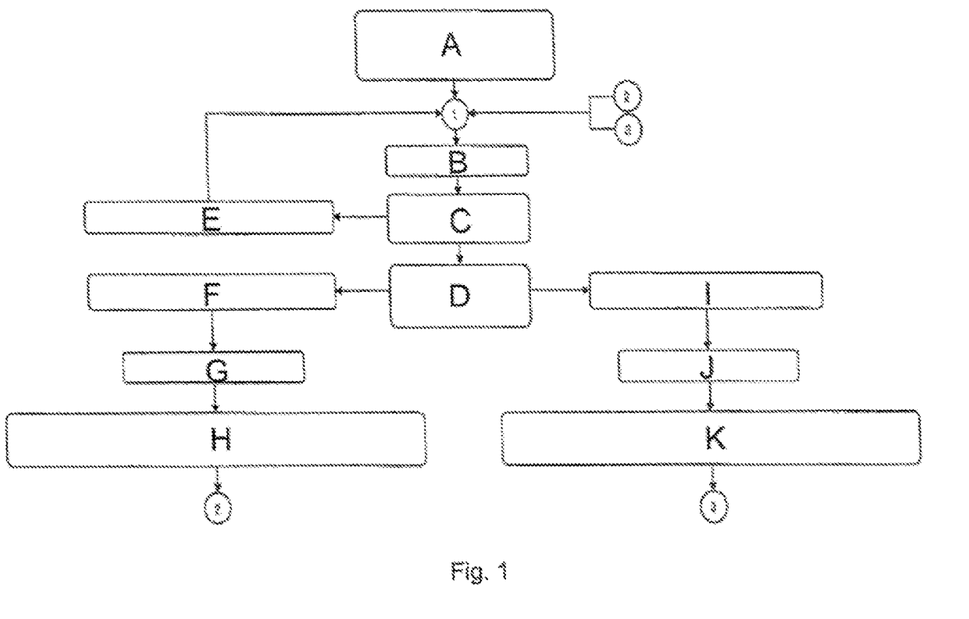
FIG. 1 shows a flow diagram for representing the process sequence of the regulation method of the present disclosure.

In FIG. 1 a flow diagram for representing the process sequence of the regulation method is shown having the following steps (A-K):

A—The ventilator is in operation. The operating point consists of fluidic and motor-related parameters. The actual values of the fluidic and motor-related parameters are known. A target value for the fluidic parameter is specified.

B—The ventilator is operated with a constant motor parameter 1 or 2.

C—A comparison of the actual value and the target value of the fluidic parameter with the associated motor parameters occurs.

D—The actual value of the fluidic parameter≠target value of the fluidic parameter (detection of a change of the operating point due to change of the motor parameters).

E—The actual value of the fluidic parameter=the target value of the fluidic parameter.

F—The fluidic parameter with the associated motor parameters does not exceed the inflection operating point.

G—The ventilator does not change the constant motor parameter.

H—The difference between the actual value and the target value of the fluidic parameter is determined. The actual value of the fluidic parameter is regulated by means of the rotational speed change to the target value of the fluidic parameter. For this purpose, the constant motor parameter 1 or 2 is accordingly adjusted. The rotational speed change necessary for this purpose is determined via the ventilator rules and/or the ventilator characteristic diagram.

I—The fluidic parameter with the associated motor parameters exceeds the inflection operating point.

J—The ventilator changes the motor parameter from 1 to 2 or vice versa.

K—The difference between the actual value and the target value of the fluidic parameter is determined. The actual value of the fluidic parameter is regulated by means of the rotational speed change to the target value of the fluidic parameter. For this purpose, the constant motor parameter 1 or 2 is adjusted accordingly. The rotational speed change necessary for this purpose is determined via the ventilator rules and/or the ventilator characteristic diagram.

Figure 2:
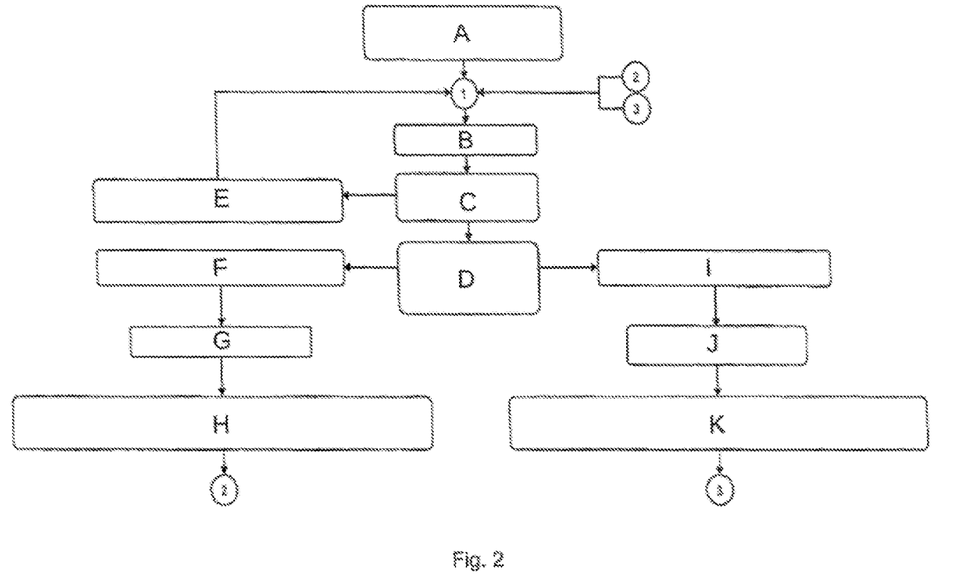
FIG. 2 shows a flow diagram representing the process sequence of the regulation method based on an alternative embodiment example of the present disclosure.

Referring now to FIG. 2 a flow diagram representing the process sequence of the regulation method based on an alternative embodiment example of the invention is shown having the following steps (A-K):

A—The ventilator is at the operating point consisting of volume flow, pressure, rotational speed and power. The actual values of these parameters are known. A target value for the volume flow is specified.

B—The ventilator is operated with rotational speed constancy or power constancy.

C—A comparison of the actual value and the target value of the volume flow with the associated rotational speed and power occurs.

D—The actual value of the volume flow≠target value of the volume flow (detection of a change of the operating point, for example, an added increase of the pressure, due to change of the rotational speed or power).

E—The actual value of the volume flow=the target value of the volume flow.

F—The volume flow with the associated rotational speed and power does not exceed the inflection operating point.

G—The ventilator does not change the rotational speed constancy/power constancy.

H—The difference between the actual value and the target value of the volume flow is determined. The actual value of the volume flow is regulated by means of the rotational speed change to the target value of the volume flow. For this purpose, the rotational speed constancy/power constancy is adjusted accordingly. The rotational speed change necessary for this purpose is determined via the ventilator rules and/or the ventilator characteristic diagram.

I—The volume flow with the associated rotational speed and power exceeds the inflection operating point.

J—The ventilator changes from rotational speed constancy to power constancy or vice versa.

K—The difference between the actual value and the target value of the volume flow is determined. The actual value of the volume flow is regulated by means of the rotational speed change to the target value of the volume flow. For this purpose, the rotational speed constancy/power constancy is adjusted accordingly. The rotational speed change necessary for this purpose is determined via the ventilator rules and/or the ventilator characteristic diagram.

Figure 3:
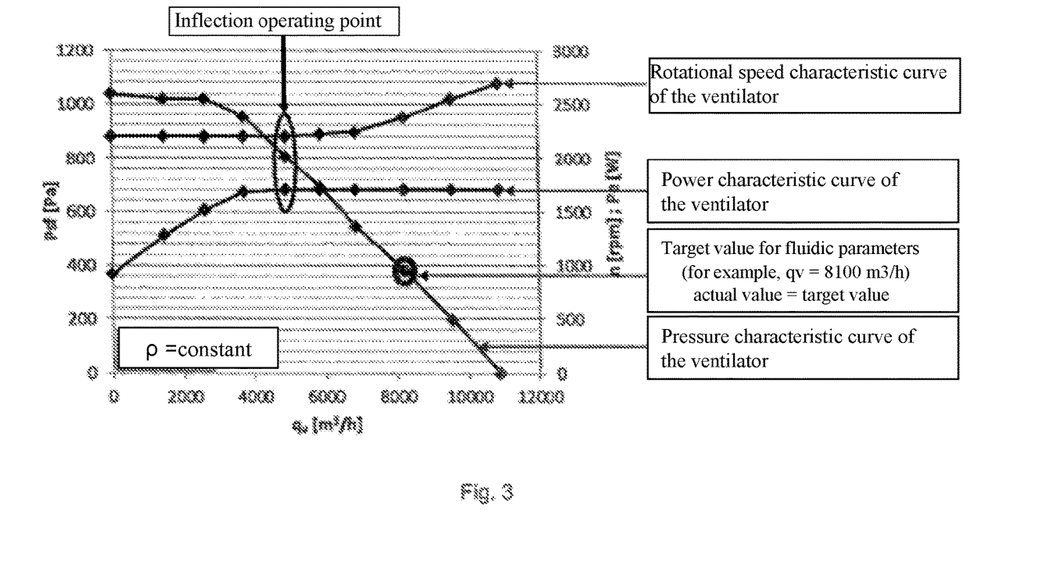
FIG. 3 shows another diagram with different characteristic curves of an exemplary ventilator.

In FIG. 3 a diagram with different characteristic curves of an exemplary ventilator and with the inflection operating point is shown, wherein the actual value of the volume flow is equal to the target value (The ventilator is operated at a constant power).

Figure 4:
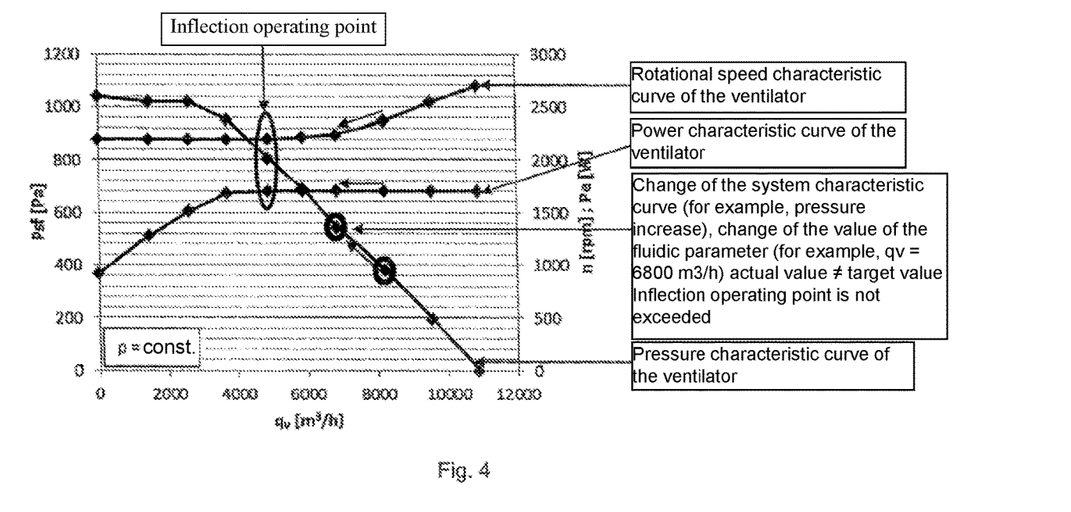
FIG. 4 shows another diagram with different characteristic curves of an exemplary ventilator similar to FIG. 3.

Referring now to FIG. 4 a diagram with different characteristic curves of an exemplary ventilator similar to FIG. 3 and with the inflection operating point is shown, wherein the actual value of the volume flow is not equal to the target value due to an external pressure increase (The ventilator is operated at a constant power, the rotational speed decreases).

Figure 5:
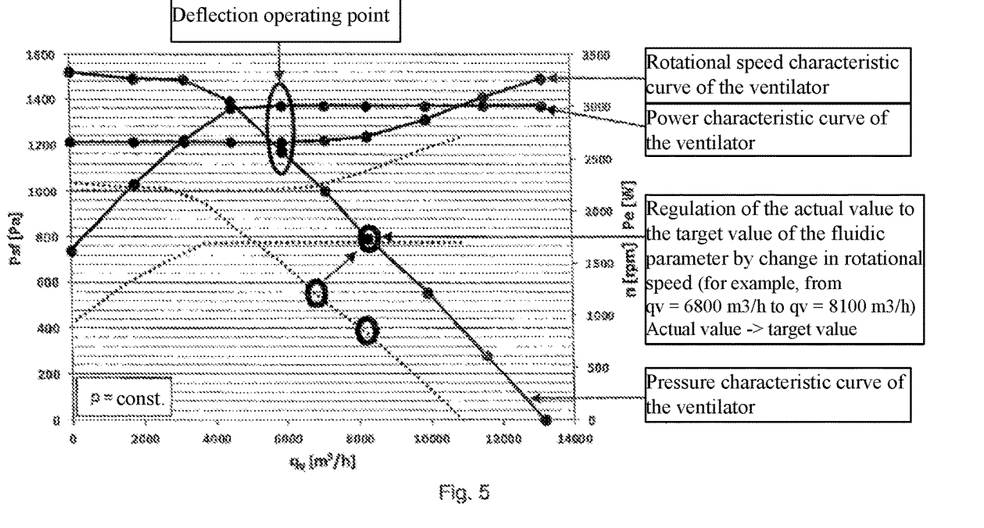
FIG. 5 shows another diagram with the different characteristic curves of an exemplary ventilator similar to FIG. 4.

In FIG. 5 a diagram with the different characteristic curves of an exemplary ventilator similar to FIG. 4 is shown, wherein the actual value of the volume flow is regulated to the target value by means of a rotational speed change (The ventilator is operated constantly at the new power).

Figure 6:
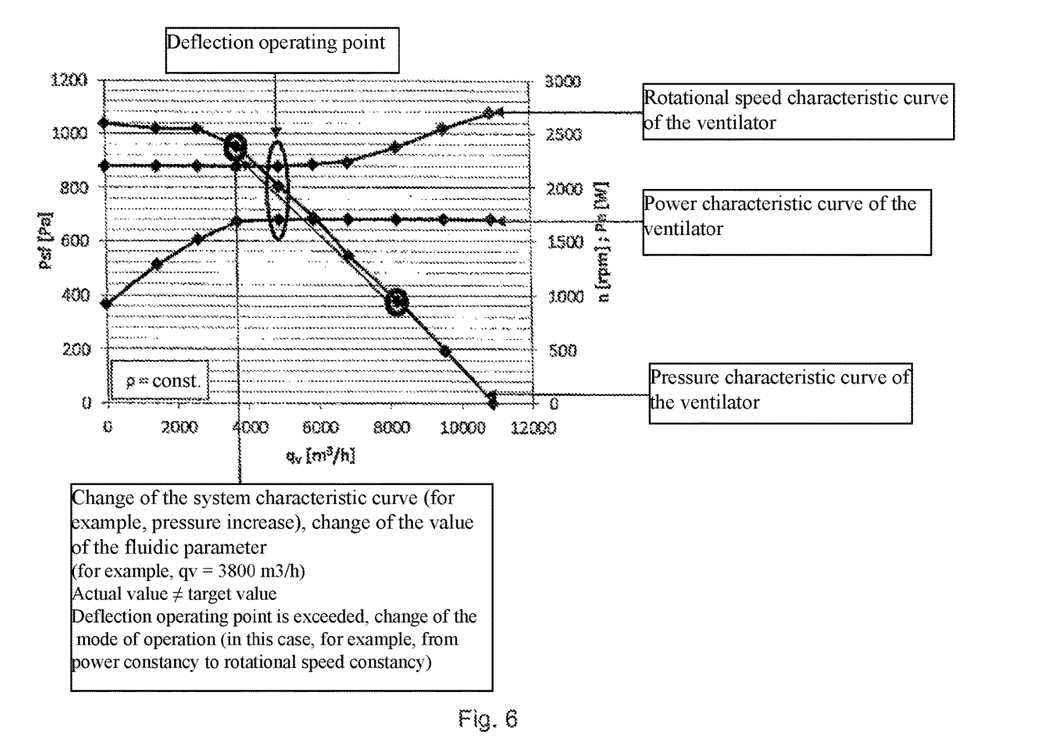
FIG. 6 shows another diagram with the different characteristic curves of an exemplary ventilator.

Referring now to FIG. 6 a diagram with the different characteristic curves of an exemplary ventilator and with the inflection operating point, wherein the actual value of the volume flow is not equal to the target value due to such a pressure increase, so that the actual value exceeds the inflection operating point. When the inflection operating point is exceeded, the mode of operation changes from a constant power to a constant rotational speed, and The embodiment of the invention is not limited to the preferred embodiment examples indicated above. Instead it is possible to conceive of a number of variants which use the represented solution even in the case of embodiments of fundamentally different kind. While the above description constitutes the preferred embodiments of the present invention, it will be appreciated that the invention is susceptible to modification, variation and change without departing from the proper scope and fair meaning of the accompanying claims.

The invention claimed is:

1. A method for regulating a fluidic parameter Pi, actual to a predetermined target value Pi, target by controlling to a selected constant value a first motor parameter Mi of a plurality of motor parameters of a ventilator in a ventilation system, the method comprising the steps of:

selecting the target value of the fluidic parameter Pi, target, operating the ventilator with the first motor parameter Mi, other than a rotational speed of the motor, controlled to the selected constant value, acquiring an actual value of at least one of the plurality of motor parameters, determining an actual value of the fluidic parameter Pi, actual at least in part from the first actual value of the at least one of the plurality of the motor parameters, comparing the actual value and the target value of the fluidic parameter Pi, and determining a deviation occurs between the actual and target values of fluidic parameter Pi, in response to determining that a deviation in the actual-target comparison of the fluidic parameters has occurred, determining a change of an operating point of the ventilator has occurred and thus a change of at least one of the plurality of motor parameters, other than the first motor parameter Mi controlled to the selected constant value has occurred, and in response to determining that a change in the operating point of the ventilator has occurred, determining the change in the operating point results in a change of the fluidic parameter Pi above an inflection operating point, and in response the first motor parameter Mi controlled to the selected constant value is switched to control of the rotational speed of the motor, and the actual value of the first motor parameter Mi previously regulated to a constant value is changed via the adjustment of the rotational speed of the motor, such that the actual value of the fluidic parameter is regulated to its target value Pi, target via control of the rotational speed of the motor rather than the control of the first motor parameter Mi.

2. The method according claim 1, further comprising: determining no deviation has occurred in the actual-target comparison of the fluidic parameters, and in response the ventilator is not adjusted, but rather continues to be operated with the first motor parameter Mi regulated to the selected constant value.

3. The method according to claim 2, wherein data for the targeted adjustment of the rotational speed is obtained at least from data which were determined from a measured fluidic and motor-related parameter characteristic diagram of the ventilator.

4. The method according to claim 1, characterized in that the fluidic parameter to be regulated is volume flow or pressure.

5. The method according to claim 1, characterized in that the first motor parameter to be regulated is power or current or torque.

6. The method according to claim 2, characterized in that the fluidic parameter to be regulated is volume flow or pressure.

7. The method according to claim 2, characterized in that the first motor parameter to be regulated is power or current or torque.

8. The method according to claim 3, characterized in that the fluidic parameter to be regulated is volume flow or pressure.

9. The method according to claim 3, characterized in that the first motor parameter to be regulated is power or current or torque.

10. The method according to claim 1, further comprising:
    determining the change in the operating point results in a change of the fluidic parameter $P_i$ that does not exceed the inflection operating point, and in response the selected constant value of the first motor parameter $M_i$ is changed.

\* \* \* \* \*